N. L. BAKER.
RIM FOR AUTOMOBILE WHEELS.
APPLICATION FILED JAN. 15, 1918. RENEWED JUNE 25, 1921.
1,405,563.
Patented Feb. 7, 1922.
2 SHEETS—SHEET 1.
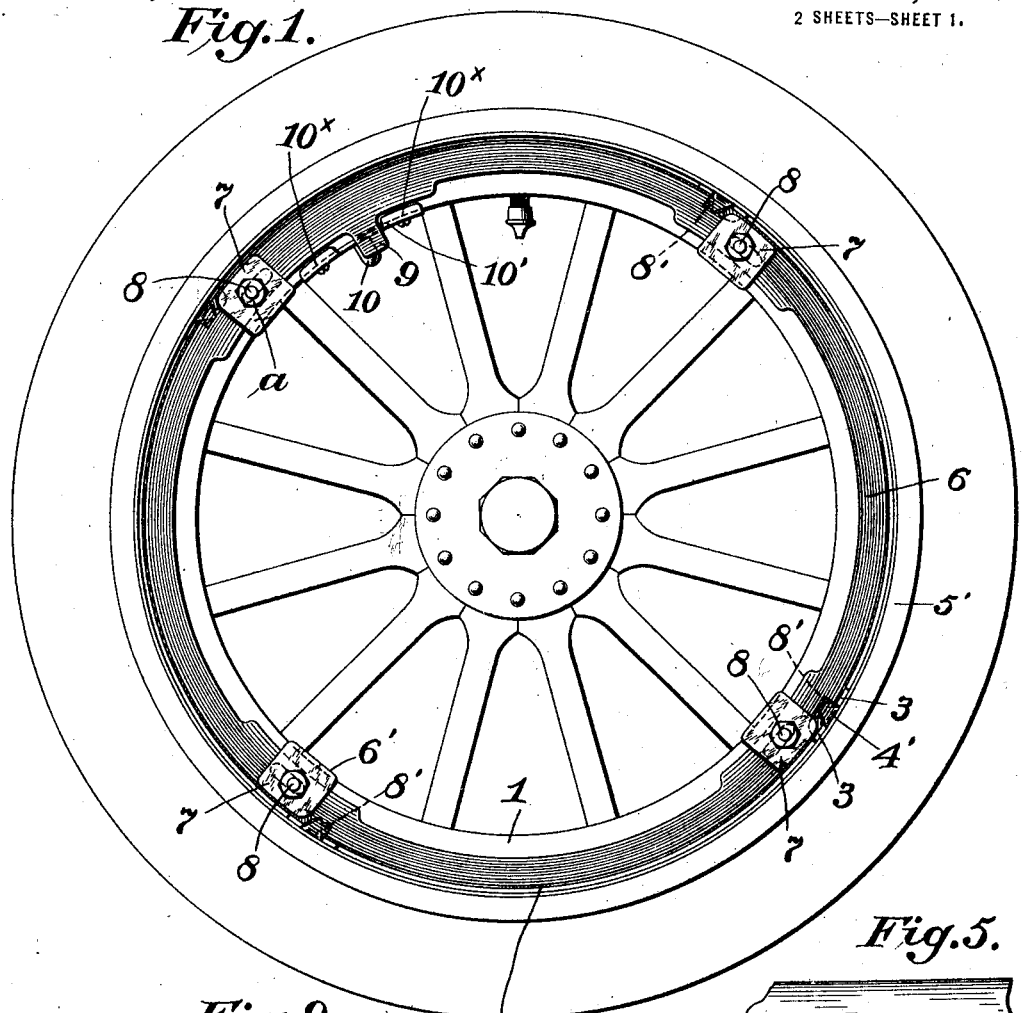
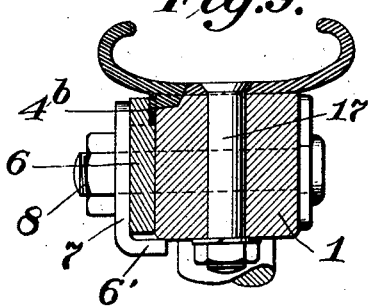
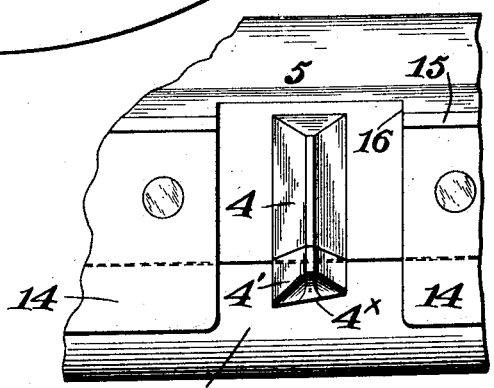
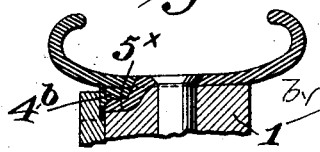
Inventor:
Norman L. Baker,
by Spear, Middleton, Donaldson & Spear
Attys.

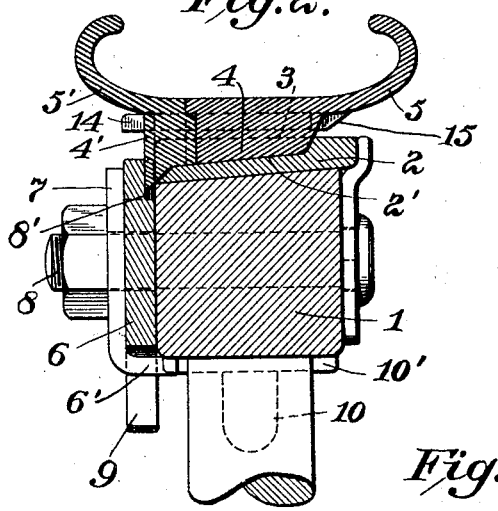
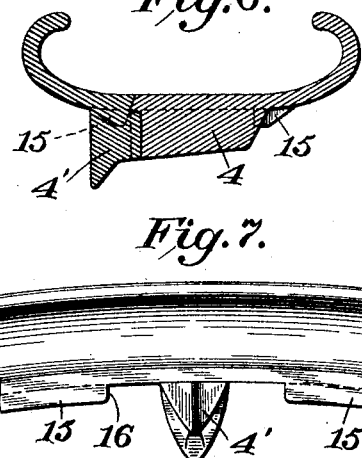
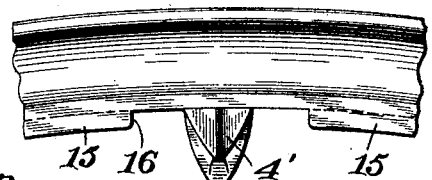
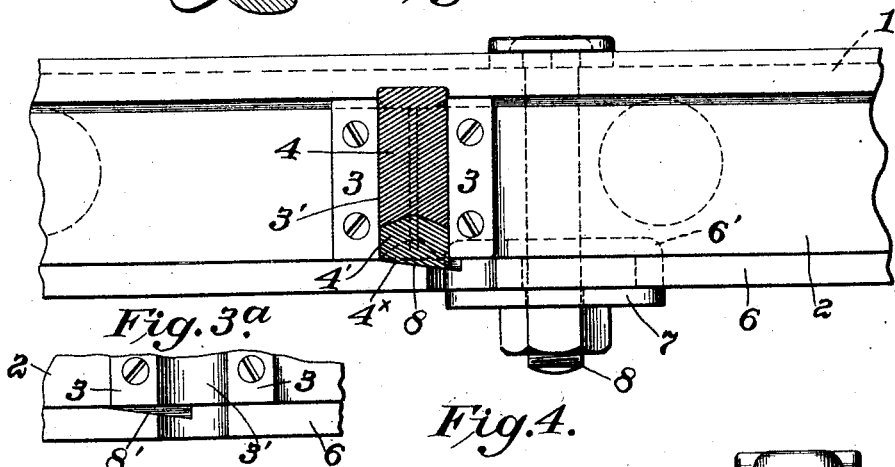
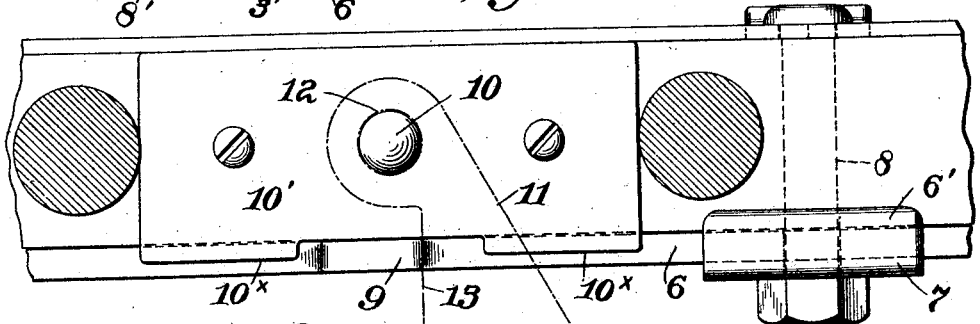

UNITED STATES PATENT OFFICE.

NORMAN L. BAKER, OF PHILADELPHIA, PENNSYLVANIA, ASSIGNOR TO N. L. BAKER MANUFACTURING CO., A CORPORATION OF DELAWARE.

RIM FOR AUTOMOBILE WHEELS.

1,405,563.                    Specification of Letters Patent.      Patented Feb. 7, 1922.

Application filed January 15, 1918, Serial No. 211,983. Renewed June 25, 1921. Serial No. 480,468.

*To all whom it may concern:*

Be it known that I, NORMAN L. BAKER, a citizen of the United States, and resident of Philadelphia, Pennsylvania, have invented certain new and useful Improvements in Rims for Automobile Wheels, of which the following is a specification.

My present invention relates to the general form of demountable appliance for automobile tires disclosed in application for Letters Patent of the United States filed by me November 5, 1917, Serial Number 200,402, and the invention consists in the features and combination and arrangement of parts hereinafter described, and particularly pointed out in the claims.

In the accompanying drawings,

Figure 1 is a side elevation of a wheel embodying my invention.

Figure 2 is a cross sectional view of the wheel of Figure 1 showing the invention applied in connection with a removable clincher flange.

Figure 3 is a plan view of the shoe of the wheel with the rim and clincher flange removed, but showing in section one of the composite lugs of these parts in place.

Figure 3ª is a detail view similar to Figure 3 showing the cam ring in a slightly different position from that shown in Figure 3.

Figure 4 is a bottom plan view of the felly or in other words it is a developed view of the inner face of the felly.

Figure 5 is a bottom plan view of a portion of the rim and its removable clincher flange.

Figure 6 is a cross sectional view of a rim with its removable clincher flange, this view being a modification of this clincher feature.

Figure 7 is an elevation of the removable clincher flange looking from the right of Figure 6 and detached from the main part of the rim.

Figure 8 is a cross sectional view of a removable rim.

Figure 9 is a cross sectional view of a rim with a removable clincher portion, this being a modification.

Figure 10 is a cross sectional view of a further modification.

In these drawings 1 is the wheel felly, 2 is a metallic ring or shoe suitably secured thereto.

At suitable intervals around this shoe or ring, as shown in Figure 3, metal pieces or plates 3 are secured thereto by screws or otherwise, leaving between them spaces or recesses 3', adapted to receive lugs 4 carried by and fixed to the rim 5. This rim in Figure 2 is shown as provided with a removable clincher flange 5', and this member is also provided with a lug 4' which is complementary to the lug 4, forming practically a continuation thereof, and fitting in the recess 3'. The inner surface of the lugs 4, 4' are inclined to act as wedge members against the corresponding inclined surface of the shoe or ring 2, as indicated at 2', so that as the rim is forced laterally the wedge-like surfaces will work to position the rim in relation to the felly. For clamping and retaining the parts together I employ a ring 6 fitting against the lateral outside face of the felly, being held in place by clips 7 of angular form, which are in turn held in place by the bolts 8. These clips have their main body portions fitting over the ring 6 and their shorter flanges 6' fit against the inner face of the felly. This ring has a cam incline at 8' on its inner face to fit a complementary incline $4^x$ on the end of the lug section 4', so that when the ring is turned to make its incline work against the complementary incline $4^x$ of the end of the lug 4' this lug, together with the clincher flange to which it is attached, will be moved laterally into proper position on the felly and the lug 4' bearing at its inner end against the complementary lug 4 of the main part of the rim will move this laterally into proper place, the inclined surfaces at 2', causing the wedging action of the rim sections onto the felly. There are a number of these cam faces 8' on the clamping ring and a corresponding number of the wedge lugs 4, 4' disposed at intervals about the wheel, so that by turning the ring 6 the clamping and holding of the rim will be effected at these various points simultaneously.

For operating the ring circumferentially I provide a lug or projection 9 extending radially inward from the ring and integral therewith, and a pin 10 is fixed on the inner face of the felly projecting radially inward. A lever 11 has an eye 12 to engage the pin 10 and it has a bearing edge 13 adapted to engage the lug 9, so that by turning this lever the ring 6 can be moved to make its cam inclines 8' press against the lugs 4', and force them laterally, and these lugs acting through the complementary lugs 4 will position the entire rim in place.

The lugs 4, 4' fitting as they do within the recesses 3' will retain the rim sections against circumferential displacement in relation to the felly, the sides of the lugs bearing against the edges of the blocks or plates 3. The lugs 4' may be formed V-shape to fit complementary recesses in the outer ends of the lugs 4.

In order to release the rim the clamping ring 6 is moved in a direction opposite to that above described by reversing the position of the lever 11, and making the edge 13 bear on the opposite side of the lug 9.

In the use of the invention the tire may be removed by removing the clincher flange without removing the main body of the rim 5. I may, however, employ a rim of the form shown in Figure 8, which must be removed as one body, it having no removable clincher flange. In this instance the lug instead of being made up of the two sections 4, 4', is made in one piece as shown at 4$^a$.

The rim, when made with the removable clincher section or flange 5', may be provided as shown in Figures 2 and 5 with plates 14 rivetted to the main rim section 5, and extending laterally far enough to reach under the removable clincher section, and afford a support therefor and in placing the clincher flange in position or removing it, it is slid over these plates.

The invention is shown as applied to a rim of the type known as the Firestone having strengthening ribs extending circumferentially on the inner face of the rim, as shown at 15, these ribs being cut away as may be necessary as shown at 16, Figs. 5 and 7, to accommodate the new construction.

In Figure 6 the two ribs 15 are preserved, except at the point where the lugs occur and in this view there is no plate as 14 in the structure, whereas where the plate 14 is used as in Figure 2 the rib 15 is entirely removed from the clincher section or flange.

In Figure 9 the main part of the rim is secured to the felly permanently by bolts as at 17, and the removable clincher flange has the centering and holding lug 4$^b$ thereon to be engaged by the clamping ring 6. The lug in this case fits into a recess in the wood of the felly, but in order to make a metallic seat or socket for receiving this lug I may extend the main body of the rim, as shown in Figure 10, at 5$^x$ reaching under the lug and furnishing a bearing therefor.

In Figures 1 and 4 I show a plate 10' carrying the pin 10, this plate being screwed to the inner face of the felly. This plate has lips 10$^x$ fitting up alongside of the side face of the felly, these lips serving to brace the plate 10'.

While I have shown the lugs 4 and 4' in alignment I do not limit myself in this respect.

I do not limit myself to the ring form of clamping means above described for as shown in an application filed of even date herewith, Serial No. 211,984, I may employ wedge or clamping members individual to the several wedging and centering lugs 4 or 4'.

The ring 6 when adjusted to wedge the parts together may be held by tightening up the nut at $a$. At the other points where the ring is guided by the clips 7 the bolts may be simply rivetted in place, and sufficient ease of movement afforded to the ring 6 at these points to permit its ready adjustment in either direction when the nut $a$ is loosened.

What I claim is:

1. In combination a felly band having a transverse groove with an inclined bottom sloping up from one face of the wheel towards the other, a main rim portion, a clincher rim portion, each having a lug with an inclined bottom face to work on the inclined bottom of the groove and wedging means on the felly for forcing the clincher portion against the main portion of the rim and holding them in place, said main rim portion and clincher rim portion being in connection only by contact with the clincher rim portion bearing laterally against the main rim portion and both being removable from the felly band, substantially as described.

2. In combination a felly band having a transverse groove with an inclined bottom sloping up from one face of the wheel towards the other face, a main rim portion, a clincher rim portion, said main and clincher rim portions each having a lug with an inclined bottom face to work on the inclined bottom of the groove, and means disposed on the felly for acting upon the clincher portion at different points around the main portion of the rim and to set the lug in the groove, said clincher and rim portions having means by which they interlock and both being removable from the felly band, substantially as described.

In testimony whereof, I affix my signature.

NORMAN L. BAKER.